Feb. 12, 1935. H. A. OTIS 1,990,562
TRANSPORTATION MEANS
Original Filed June 10, 1931
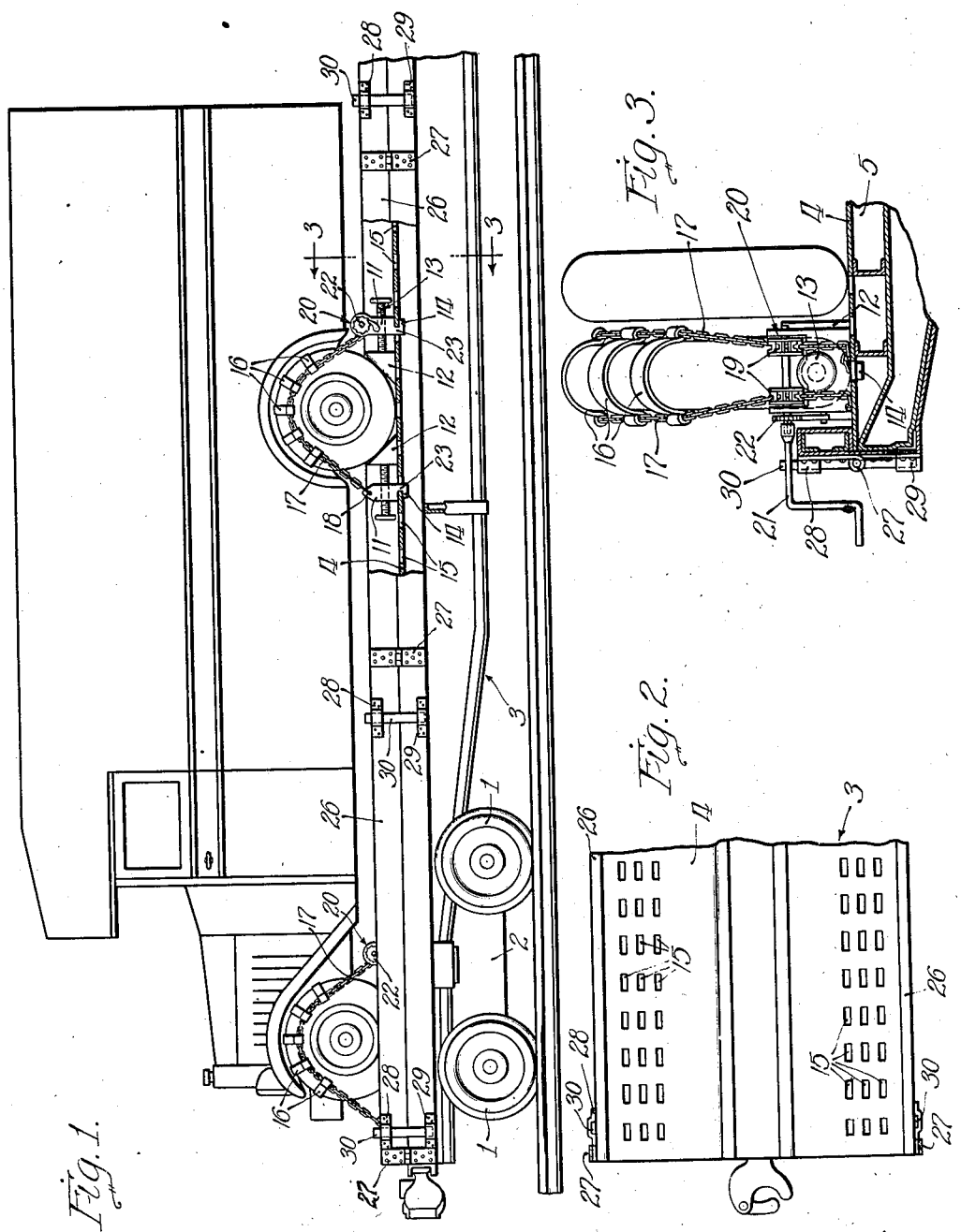

Patented Feb. 12, 1935

1,990,562

UNITED STATES PATENT OFFICE 1,990,562

TRANSPORTATION MEANS

Harold A. Otis, Glen Ellyn, Ill., assignor to Chicago North Shore & Milwaukee Railroad Company, Chicago, Ill., a corporation of Illinois Original application June 10, 1931, Serial No. 543,258. Divided and this application December 11, 1931, Serial No. 580,239

9 Claims. (Cl. 105—159)

My invention relates to transport means, and is more particularly concerned with a track vehicle and fastening means associated therewith for anchoring a road vehicle into place upon said tractor vehicle for shipment thereon.

It is recognized that railroads are efficient and economical in transporting heavy loads at high speeds and at a high degree of safety and certainty in comparison with many other means of transportation. Upon the other hand, road vehicles are advantageous because they may travel almost anywhere and therefore are not restricted to follow definite or fixed lines of travel, as are railroads. Needless to say, road vehicles are also advantageous in cities or towns to make deliveries to one or more destinations, as desirable, such vehicles being particularly adapted for that purpose. Moreover, it is known that in combining the above two forms of transportation, the disadvantages of each form are eliminated and the advantages of both forms are retained. Moreover, to my knowledge, no railroad car has been devised having suitably adaptable means for conveniently and expeditiously anchoring any type of road vehicle thereon with complete safety.

Fundamentally, the main problem involved is to devise a track vehicle which is particularly adapted for conveying road vehicles and which is provided with economical means for anchoring the road vehicle in fixed position relative to the track vehicle within a short space of time. Initially, a track vehicle of this type should be able to accommodate all kinds of road vehicles so as to have unlimited utility. Furthermore, it should not be required or necessary that the road vehicles be made to carry added equipment or to be specially designed in any way for the purpose of transportation on the track vehicle, it being obvious that if either of the foregoing were necessary, the economy and feasibility of the present invention would be somewhat defeated. Briefly, then, the problem is to suit the track vehicle to the road vehicles without regard as to what type or size the latter may happen to be, and inherently to devise a track vehicle which is capable of having the road vehicles quickly secured thereon and quickly releasable therefrom through adaptable fastening means, whereby loading and unloading of the road vehicles is expeditiously accomplished.

Accordingly, the main object of my invention is to provide a track vehicle, preferably in the form of a flat car, for suitably receiving one or more road vehicles thereon, and which is equipped with suitable means for firmly securing the road vehicles to the bed thereof, the road vehicles being transported with their own wheels resting upon said bed, yet without interfering with the use of the track vehicle as a conventional flat car.

The provision of a means for securing of the road vehicles into transportable position in relation to the track vehicle or flat car presents numerous difficulties. For example, the larger road vehicles such as moving vans or the like having exceedingly low bodies making it difficult for a man to crawl thereunder for attaching a fastening means to the axles or frames thereof. Then again, somewhat smaller vehicles have sufficient head room for a man to crawl thereunder to attach suitable fastening means to the frames or axles thereof, but it is apparent that the same means could not be utilized for the larger vehicles for the reasons above noted. Furthermore, the scheme of securing a road vehicle to the bed of a car by providing suitable fastening means for attachment to the frames or axles of the road vehicles is further objectionable for three reasons: First, too much time is required in the process of fastening and unfastening the vehicles to the car bed. Second, the fastening means should not only comprise a mechanism for holding the wheels of a road vehicle against the bed of a car and to prevent fore and aft movement relative thereto, but should also have the capacity to laterally brace the road vehicle to prevent lateral movement thereof relative to the car bed. Third, any fastening means that may be permanently located on the bed of a flat car is apt to interfere with the loading and unloading of the road vehicle onto and off of the flat car, and is also likely to interfere with road vehicles having considerably underslung bodies when the latter are being driven or moved into transportable position on the track vehicle. The means which I have devised to overcome the above related difficulties is universally adapted to anchor any type of road vehicle to the car bed, regardless of the wheel base or tread thereof, and regardless of the type of wheels or tires or of the respective dimensions of the same. The particular means of my construction extends between the wheels of the road vehicle and the flat car substantially externally of the sides of the vehicle, and functions to hold the wheels of the road vehicle firmly against the bed of the car to prevent fore and aft movement of the road vehicle, and to brace the same laterally to prevent lateral slippage of the vehicle relative to the car, said means being completely adjustable for accommodating all types of road vehicles as will hereinafter appear from the detailed description thereof.

Now, in order to acquaint those skilled in the art with the manner of constructing and operating a device of my invention, I shall describe, in connection with the accompanying drawing, a specific embodiment of the invention.

In the drawing:—

Figure 1 is a fragmentary side elevational view of a flat car illustrating the application of my new and novel fastening means as applied to the wheels of a road vehicle to hold the same upon the flat car;

Figure 2 is a fragmentary plan view of a portion of the flat car illustrating the construction of the bed thereof; and Figure 3 is a vertical cross sectional view taken through one edge of the flat car and substantially along the plane of the line 3—3 of Figure 1.

The flat car and fastening means herein disclosed and described are devised for the same purpose as the construction shown in my copending application filed June 10, 1931, bearing the Serial No. 543,258, the subject matter of the present application being a division of the aforesaid application.

Referring to the drawing, the car generally comprises track wheels 1 embodied in a suitable truck 2 which may be of standard or preferred design, the wheels thereof being adapted to run upon the rails of a railroad. The wheels, trucks and rails may be of standard design and standard gauge, or of any preferred construction and gauge. The main body 3 of the car is suitably mounted upon the truck through pivotal connections, such as are well understood by those skilled in the art and which form in themselves no novel feature of the present invention. The body 3 includes a bed or platform 4 adapted as a runway for the road vehicles. The bed may be of any suitable construction but is preferably of steel boiler plate secured by welding, riveting or bolting the same to the main frame or chassis of the car as designated in general by the reference character 5.

The fastening means of the present invention is in the nature of an improvement over the device illustrated and described in my copending application hereinbefore designated. Said fastening means is a composite structure of chock members and saddle means whereby the positioning of the chocks along the flat car bed automatically positions the saddle means in proper relationship for engagement with the wheels of a road vehicle. Each of the fastening means includes a pair of anchors or stops 11 having beveled chocks 12 adjustably connected therewith by means of suitable jack screws 13. The anchors are provided with tongues 14 or other suitable means which are adapted to be inserted through suitable apertures 15 located in the car bed with the tongues engaging the underside of the bed when in operative position in the manner best illustrated in Figure 1. In order to be able to accommodate road vehicles of various tread sizes and wheel bases, the apertures 15 are spaced laterally of the car as well as longitudinally thereof, in some such fashion as best shown in Figure 2. It is to be noted that the apertures or openings are of such a length as to allow the tongues to be freely inserted therethrough, and upon tightening the jack screws to force the chocks against the circumference of the wheel of a road vehicle, the tongues are forced longitudinally of the slots or openings and into engagement with the underside of the bed plate 4.

The means for engaging the upper peripheral portions of the road vehicle wheels, comprises a plurality of saddle members 16 that are suitably connected by means of any type of flexible member such as chains 17. The ends of each of the saddle members may be securely clamped to the chain, or if desired, they may be suitably formed for sliding movement along the chains 17. The chains 17 are secured to one of the anchors as at 18, and the loose ends thereof are connected with the sprocket members 19 of a windlass mechanism 20, the latter being mounted on the other anchor of that particular set. A removable crank 21 is utilized for turning the windlass mechanism to draw up the chains to any desired tension for tightly seating the saddles upon the vehicle wheel, and a ratchet mechanism 22 functions to maintain the chains under tension until said mechanism is released. It is to be noted from Figure 3 that the chocks 12 are only of such a length as to firmly block one wheel against fore and aft movement. By making the tongue stems 23 of the anchors polygonal in cross section, such as rectangular or square, and by forming the apertures 15 in the car bed in similar outlines, it is possible to prevent turning movement of the anchors thereby maintaining the chocks at all times in perfect transversely disposed blocking position.

The flat car of the present construction is preferably provided with hinged sides or wheel guards 26 to add to the convenience of securing and removing the new and novel fastening means hereinbefore fully described. It so happens in utilizing my present form of fastening means that it may be inconvenient under certain conditions to place the wheel chocks of the fastening means into their proper positions, particularly when anchoring road vehicles having a width substantially as great as the width of the flat car and which have extremely low bodies. This difficulty would be encountered if the upwardly projecting car sides or wheel guards were rigidly constructed. Therefore, I hinge the upwardly projecting car sides substantially at the plane of the car bed, and although the hinged guard is illustrated as a single hinge member, it is clearly apparent that the same may be divided into a plurality of hinged sections if that is desired. The hinges are indicated at 27, and in order to normally maintain the car sides or wheel guards in vertical position, any suitable means may be employed. To do this it is preferable to provide the wheel guards with straps 28 and the rigid sides of the car body with similar straps 29 disposed in vertical alignment with the former, the straps being adapted for the reception of suitable stakes or bars 30. With this construction, the road vehicles may be readily driven onto the car and thereafter the stakes removed to allow the wheel guards 26 to swing outwardly for providing ample room for the setting of the chocks of the fastening means. After the chocks are in place the guards are again returned to their normal vertical position and the stakes inserted into the straps.

The fastening means is compactly arranged, convenient in its utility, and may be expeditiously applied or removed from a road vehicle wheel in the following manner: After a road vehicle has been driven onto the bed of the flat car, the hinged wheel guards may or may not be swung outwardly depending upon the size of the road vehicle, and then one of the anchors, preferably the one to which the chains are fixedly secured, is placed upon the car bed in close proximity to the road vehicle wheel. Thereafter the second anchor is similarly positioned either to the rear of or forwardly of the wheel depending upon the choice of positioning the first anchor. The saddles may be made to embrace the periphery of the wheel after positioning the first anchor or they may be applied after both anchors are positioned. Having once positioned the anchors, the saddle members may be tensioned upon the wheel by means of the windlass either before or after forcing the chocks against the circumference of the road vehicle wheel through the agency of the jack screws. It is preferable, however, to first center the wheel substantially intermediate the two anchors by means of the adjustable chocks without forcing the latter into their final blocking positions, and to secondly tighten the saddle members by means of the windlass. Thereafter by adjusting the chocks into their final position against the circumference of the wheel, the chocks will not only act to fix the wheel against any fore and aft movement, but will also tend to act upwardly to slightly raise the wheel by means of the beveled surfaces of the chocks acting as cams or wedges whereby the grip between the chain connected saddle members and the wheel will become still more effective so that it will be practically impossible for the road vehicle wheels to move relative to the track vehicle bed. Although the chocks have been shown as having straight or flat beveled faces, it is also possible if desirable to provide the chocks with concave surfaces in the plane of the beveled faces thereof to conform substantially with the transverse curvature of the wheel or its tire, which will further tend to safeguard against any relative movement of the wheels of the road vehicle relative to the track vehicle, and particularly to safeguard against the lateral slipping of the road vehicle wheels upon the bed of said track vehicle.

It is apparent that changes may be made in the specific structural elements constituting the herein described fastening means which will not depart from the field and scope of the present invention. Therefore I do not intend to be strictly limited to the specific description and illustrations of the device, but only insofar as the appended claims are so limited.

What I claim is:

1. In combination, a track vehicle having a perforated platform, a road vehicle having its wheels resting upon said platform, and a plurality of means for anchoring said road vehicle in fixed relation to said track vehicle, each of said means being associated with one of said vehicle wheels and comprising a pair of stops releasably connected to said platform through certain of said perforations, a pair of chocks adjustably connected with said stops and engageable with said one wheel to prevent fore and aft movement thereof, saddle means connected with one of said stops, and tensioning means connecting said saddle means with the other of said stops, said saddle means having peripheral engagement with said one wheel to prevent movement thereof away from said platform.

2. In combination, a track vehicle having a bed with polygonally shaped openings therein, a road vehicle having its wheels resting upon said bed, and a plurality of means for anchoring said road vehicle in fixed relation to said track vehicle, each of said means being associated with one of said wheels and comprising a pair of stop members releasably connected to said bed through certain of said openings therein, each of said stop members having a stem shaped to conform with the outlines of said polygonal bed openings to prevent turning movement of said members relative to said bed, a pair of chocks each adjustably connected with one of said stop members and movable toward and away therefrom, said chocks being engageable with said one wheel to prevent fore and aft movement thereof, saddle means connected with one of said stop members, and tensioning means for connecting said saddle means with the other of said stop members, said saddle means having peripheral engagement with said one wheel to prevent vertical movement thereof away from said bed.

3. In combination, a track vehicle having a bed, a road vehicle having its wheels supported upon said bed, and means associated with each of the wheels of said road vehicle for anchoring the latter upon said bed comprising attachment means including a chock engageable with one of said wheels and capable of being fixedly secured to said bed in any one of a plurality of positions, means associated with said attachment means for adjustably moving the chock relative to said bed while said attachment means is fixed thereto, cooperable means connected with said attachment means and said bed respectively to prevent turning of said attachment means relative to said bed, and means connected with said attachment means and having engagement with said one wheel to hold the same against the bed.

4. In combination, a track vehicle, a road vehicle having its wheels supported upon said track vehicle, and means associated with each of the wheels of said road vehicle for anchoring the latter upon said track vehicle comprising a pair of chock units associated with said track vehicle to prevent fore and aft movement of one of said wheels, each of said chock units comprising cooperable members adjustably connected with said track vehicle and adjustable relative to each other, and means adjustably connected with said pair of chock units and adapted for engagement with the upper periphery of said one wheel.

5. In combination, a track vehicle, a road vehicle having its wheels supported upon said track vehicle, and means associated with each of the wheels of said road vehicle for anchoring the latter upon said track vehicle, each comprising a pair of stop members releasably secured to said track vehicle, a pair of chock members each connected with one of stop members to prevent fore and aft movement of one of said wheels, each chock member being movable toward and away from its respective stop member, and means extending between one pair of the aforesaid members and engageable with the periphery of said wheel to prevent movement thereof away from or laterally on said track vehicle.

6. In combination, a track vehicle, a road vehicle having its wheels supported upon said track vehicle, and means associated with each of the wheels of said road vehicle for anchoring the latter upon said track vehicle comprising a first pair of members adjustably connected with said track vehicle, a second pair of members each adjustably connected with said first pair of members respectively and adapted for engaging one of said wheels of the road vehicle to prevent fore and aft movement thereof relative to the track vehicle, and means adjustably connected with one of the aforesaid pairs of members and adapted for engaging the upper periphery of said one wheel to hold the latter firmly upon said track vehicle.

7. In combination, a track vehicle, a road vehicle having its wheels supported upon said track vehicle, and means associated with each of the wheels of said road vehicle for anchoring the latter upon said track vehicle comprising a pair of detachable members secured in fixed relation upon said track vehicle, a second pair of members each adjustably connected with said first pair of members respectively and adapted for engaging one of the wheels of the road vehicle to prevent fore and aft movement thereof relative to said track vehicle, and means adjustably connected with said detachable members and adapted for engaging the upper periphery of said one wheel to hold the latter firmly upon said track vehicle.

8. A hold-down device adapted to secure vehicles to railroad cars and the like, comprising flexible members looped over the wheels of the vehicle, means adjustably anchoring the ends of said members to the car body, shiftable chock blocks disposed fore and aft of the vehicle wheels, and adjusting means reacting against said anchoring means for forcing the chock blocks against the vehicle wheels.

9. In combination, a track vehicle, a road vehicle having its wheels supported upon said track vehicle, and means associated with each of the wheels of said road vehicle for anchoring the latter upon said track vehicle comprising a first pair of members adjustably connected with said track vehicle, a second pair of members each adjustably connected with said first pair of members respectively for movement longitudinally of the track vehicle and adapted for engaging one of said wheels of the road vehicle to prevent fore and aft movement thereof relative to said track vehicle, and means connected between one of the aforesaid pairs of members comprising flexible means for engaging the upper periphery of one of said wheels and windlass mechanism for diminishing or increasing the effective length of said flexible means.

HAROLD A. OTIS.